(12) United States Patent
Liang et al.

(10) Patent No.: US 12,252,608 B2
(45) Date of Patent: Mar. 18, 2025

(54) ETHYLENE-VINYL ALCOHOL COPOLYMER RESIN PARTICLE COMPOSITION, ETHYLENE-VINYL ALCOHOL COPOLYMER FILM FORMED THEREFROM, AND MULTILAYER STRUCTURE

(71) Applicant: CHANG CHUN PETROCHEMICAL CO., LTD., Taipei (TW)

(72) Inventors: Chih Chieh Liang, Taipei (TW); Wen Hsin Lin, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 0 days.

(21) Appl. No.: 18/571,166

(22) PCT Filed: Jun. 16, 2022

(86) PCT No.: PCT/CN2022/099172
§ 371 (c)(1),
(2) Date: Dec. 15, 2023

(87) PCT Pub. No.: WO2022/262813
PCT Pub. Date: Dec. 22, 2022

(65) Prior Publication Data
US 2024/0287298 A1 Aug. 29, 2024

(30) Foreign Application Priority Data

Jun. 16, 2021 (CN) .......................... 202110666690.4
Jun. 16, 2021 (CN) .......................... 202110666705.7
Jun. 16, 2021 (CN) .......................... 202110666706.1
Jun. 16, 2021 (CN) .......................... 202110668489.X
Jun. 16, 2021 (CN) .......................... 202110668496.X (51) Int. Cl.
| | |
|---|---|
| C08L 29/04 | (2006.01) |
| B32B 7/12 | (2006.01) |
| B32B 27/08 | (2006.01) |
| B32B 27/30 | (2006.01) |
| B32B 27/32 | (2006.01) |
| C08J 5/18 | (2006.01) |
| C08L 23/08 | (2006.01) |
| C08L 23/0846 | (2025.01) |

(52) U.S. Cl.
CPC ............. *C08L 29/04* (2013.01); *B32B 7/12* (2013.01); *B32B 27/08* (2013.01); *B32B 27/306* (2013.01); *B32B 27/32* (2013.01); *C08J 5/18* (2013.01); *C08L 23/0846* (2013.01); *B32B 2250/05* (2013.01); *B32B 2250/246* (2013.01); *B32B 2250/40* (2013.01); *B32B 2307/7244* (2013.01); *B32B 2307/738* (2013.01); *C08J 2329/04* (2013.01); *C08J 2429/04* (2013.01); *C08L 2203/16* (2013.01); *C08L 2205/14* (2013.01)

(58) Field of Classification Search
CPC .................................. C08L 29/04; C08L 29/02
See application file for complete search history.

(56) References Cited

U.S. PATENT DOCUMENTS

| | | | | |
|---|---|---|---|---|
| 10,711,124 B1 * | 7/2020 | Wu | .................. | C08L 29/04 |
| 10,961,378 B1 * | 3/2021 | Lin | .................. | C08L 23/0853 |
| 11,021,599 B1 * | 6/2021 | Liang | .................. | B32B 27/32 |
| 11,124,642 B1 * | 9/2021 | Su | .................. | C08K 5/098 |
| 11,746,170 B2 * | 9/2023 | Liang | .................. | C08F 8/12 |
| | | | | 428/476.3 |
| 2013/0184136 A1 * | 7/2013 | Bekele | .................. | B32B 27/32 |
| | | | | 427/322 |
| 2022/0143959 A1 * | 5/2022 | Yoshida | .................. | B29C 48/10 |
| 2022/0403076 A1 * | 12/2022 | Liang | .................. | C08F 216/06 |
| 2022/0403077 A1 * | 12/2022 | Liang | .................. | B32B 27/32 |
| 2022/0403078 A1 * | 12/2022 | Li | .................. | C08F 216/06 |
| 2022/0403147 A1 * | 12/2022 | Liang | .................. | B32B 27/306 |
| 2022/0403212 A1 * | 12/2022 | Liang | .................. | C09J 7/29 |
| 2023/0382089 A1 * | 11/2023 | Shimo | .................. | B65D 65/40 |
| 2024/0279454 A1 * | 8/2024 | Liang | .................. | B32B 27/30 |
| 2024/0309185 A1 * | 9/2024 | Liang | .................. | B32B 27/34 |

FOREIGN PATENT DOCUMENTS

| | | |
|---|---|---|
| CA | 1337233 C | 10/1995 |
| CN | 111944262 A | 11/2020 |
| CN | 113024936 A | 6/2021 |
| JP | H11-294947 A | 10/1999 |
| JP | 2002-293948 A | 10/2002 |
| JP | 2005-068324 A | 3/2005 |
| JP | 2021-084855 A | 6/2021 |
| TW | I765750 B | 5/2022 |

* cited by examiner

*Primary Examiner* — Liam J Heincer
(74) *Attorney, Agent, or Firm* — Muncy, Geissler, Olds & Lowe, P.C.

(57) ABSTRACT

An ethylene-vinyl alcohol copolymer (EVOH) resin particle composition, an EVOH film formed therefrom, and a multilayer structure containing the same. The EVOH resin particle composition includes: a first EVOH resin particle having a surface core void volume (Vvc) of 0.002~14 $\mu m^3/\mu m^2$; and a second EVOH resin particle having a surface core void volume (Vvc) of 0.010~48 $\mu m^3/\mu m^2$. This can improve the thermoformability of EVOH compositions.

16 Claims, 2 Drawing Sheets

ETHYLENE-VINYL ALCOHOL COPOLYMER RESIN PARTICLE COMPOSITION, ETHYLENE-VINYL ALCOHOL COPOLYMER FILM FORMED THEREFROM, AND MULTILAYER STRUCTURE

BACKGROUND OF THE INVENTION

1. Technical Field

The present disclosure relates to an ethylene-vinyl alcohol copolymer (EVOH) composition, and more particularly to an ethylene-vinyl alcohol copolymer (EVOH) resin particle composition, a film and multilayer structure formed from the EVOH resin particle composition.

2. Description of Related Art

Existing EVOH resin is widely applied to multilayer substances to preserve perishable goods. For instance, EVOH resin and multilayer substances made therefrom are commonly used in the food packaging industry, medical equipment and consumables industry, pharmaceutical manufacturing industry, electronics industry and agricultural chemical industry. In general, EVOH resin is incorporated into multilayer substances to function as a unique layer, i.e., an oxygen blocking layer. Furthermore, multilayer substances made from EVOH are for use in manufacturing a wide variety of containers by thermoforming.

In practice, the manufacturing sector has to meet requirements in various dimensions, such as the appearance, thermoformability and barrier function, of thermoforming products made of the aforesaid EVOH materials. For instance, the thermoforming products will be deemed satisfactory in terms of appearance if they are free of gel, surface voids or yellowing. For instance, the thermoforming products will be deemed excellent in terms of thermoformability if their differences in thickness between different regions fall within a range. For instance, the thermoforming products will be deemed perfect in terms of barrier function if their oxygen transmission rate (OTR) stays below a certain level.

BRIEF SUMMARY OF THE INVENTION

However, the prior art has never disclosed a concept or means of effectively meeting the aforesaid requirements. The inventor of the disclosure conducted research on the aforesaid technical issue and discovered that a thin-film formed from an EVOH resin particle composition comprising two EVOH resin particles each having a specific range of surface core void volume (Vvc) values exhibits satisfactory ethylene content uniformity, not to mention that thermoforming products formed from the EVOH resin particle composition exhibit satisfactory thermoformability, appearance and barrier function.

Therefore, the disclosure in one aspect provides an ethylene-vinyl alcohol copolymer (EVOH) resin particle composition, comprising: a first EVOH resin particle having a surface core void volume (Vvc) of 0.002~14 $\mu m^3/\mu m^2$ and a second EVOH resin particle having a surface core void volume (Vvc) of 0.010~48 $\mu m^3/\mu m^2$.

According to some embodiments of the disclosure, the second EVOH resin particle has a greater Vvc than the first EVOH resin particle.

According to some embodiments of the disclosure, the first EVOH resin particle has a melting point of 135~179° C., and the second EVOH resin particle has a melting point of 180~198° C.

According to some embodiments of the disclosure, the first EVOH resin particle has an ethylene content of 36~50 mole %.

According to some embodiments of the disclosure, the second EVOH resin particle has an ethylene content of 20~35 mole %.

According to some embodiments of the disclosure, the EVOH resin particle is cylindrical, elliptic cylindrical, prismoidal, spherical, ellipsoidal or biconvex-disk-shaped and has a major axis/height of 1~5 mm and a minor axis of 1~5 mm.

According to some embodiments of the disclosure, the EVOH resin particle composition has a ratio of the first EVOH resin particle to the second EVOH resin particle by weight percentage ranges from 5:95 to 75:25.

According to some embodiments of the disclosure, the EVOH resin particle composition has a boron content of 5~550 ppm.

According to some embodiments of the disclosure, the EVOH resin particle composition has an alkali metal content of 10~550 ppm.

According to some embodiments of the disclosure, the first EVOH resin particle has a surface core material volume (Vmc) of 0.001~12 $\mu m^3/\mu m^2$, and the second EVOH resin particle has a surface core material volume (Vmc) of 0.022~55 $\mu m^3/\mu m^2$.

According to some embodiments of the disclosure, the first EVOH resin particle has a root-mean-square height (Sq) surface parameter of 0.001~25 μm, and the second EVOH resin particle has a root-mean-square height (Sq) surface parameter of 0.020~65 μm.

According to some embodiments of the disclosure, the first EVOH resin particle has a surface maximum height (Sz) surface parameter of 0.030~28 μm, and the second EVOH resin particle has a surface maximum height (Sz) surface parameter of 0.120~65 μm.

According to some embodiments of the disclosure, the first EVOH resin particle has a core height difference (Sk) surface parameter of 0.010~25 μm, and the second EVOH resin particle has a core height difference (Sk) surface parameter of 0.030~65 μm.

According to some embodiments of the disclosure, the first EVOH resin particle has a linear arithmetic mean height (Ra) surface parameter of 0.001~0.600 μm, and the second EVOH resin particle has a linear arithmetic mean height (Ra) surface parameter of 0.012~0.800 μm.

According to some embodiments of the disclosure, the first EVOH resin particle has a linear maximum height (Rz) surface parameter of 0.005~7 μm, and the second EVOH resin particle has a linear maximum height (Rz) surface parameter of 0.080~7.500 μm.

The disclosure in another aspect provides an ethylene-vinyl alcohol copolymer film formed from the EVOH resin particle composition.

The disclosure in yet another aspect provides a multilayer structure, comprising: (a) at least one layer of the ethylene-vinyl alcohol copolymer film formed from the EVOH resin particle composition; (b) at least one layer of a polymer layer; and (c) at least one layer of a binding layer.

According to some embodiments of the disclosure, the polymer layer is one selected from the group consisting of a low-density polyethylene layer, polyethylene grafted maleic anhydride layer, polypropylene layer and nylon layer, and the binding layer is a tie layer.

According to some embodiments of the disclosure, the multilayer structure is a polymer layer/binding layer/ethylene-vinyl alcohol copolymer film/binding layer/polymer layer.

An ethylene-vinyl alcohol copolymer (EVOH) resin particle composition, an EVOH film formed therefrom, and a multilayer structure containing the film, as provided by the disclosure, enable thermoforming products formed from the EVOH resin particle composition to exhibit satisfactory thermoformability, appearance and barrier function in the absence of any limitations imposed by a specific theory.

BRIEF DESCRIPTION OF THE SEVERAL VIEWS OF THE DRAWING

The disclosure is illustrated by embodiments and depicted with accompanying diagrams briefly described as follows.

It is noteworthy that the accompanying diagrams are not restrictive of various aspect of the disclosure in terms of arrangements, means and features.

DETAILED DESCRIPTION OF THE INVENTION

The disclosure in one aspect provides an ethylene-vinyl alcohol copolymer (EVOH) resin particle composition, comprising: a first EVOH resin particle having a surface core void volume (Vvc) of 0.002~14 $\mu m^3/\mu m^2$ and a second EVOH resin particle having a surface core void volume (Vvc) of 0.010~48 $\mu m^3/\mu m^2$.

Figure 1:
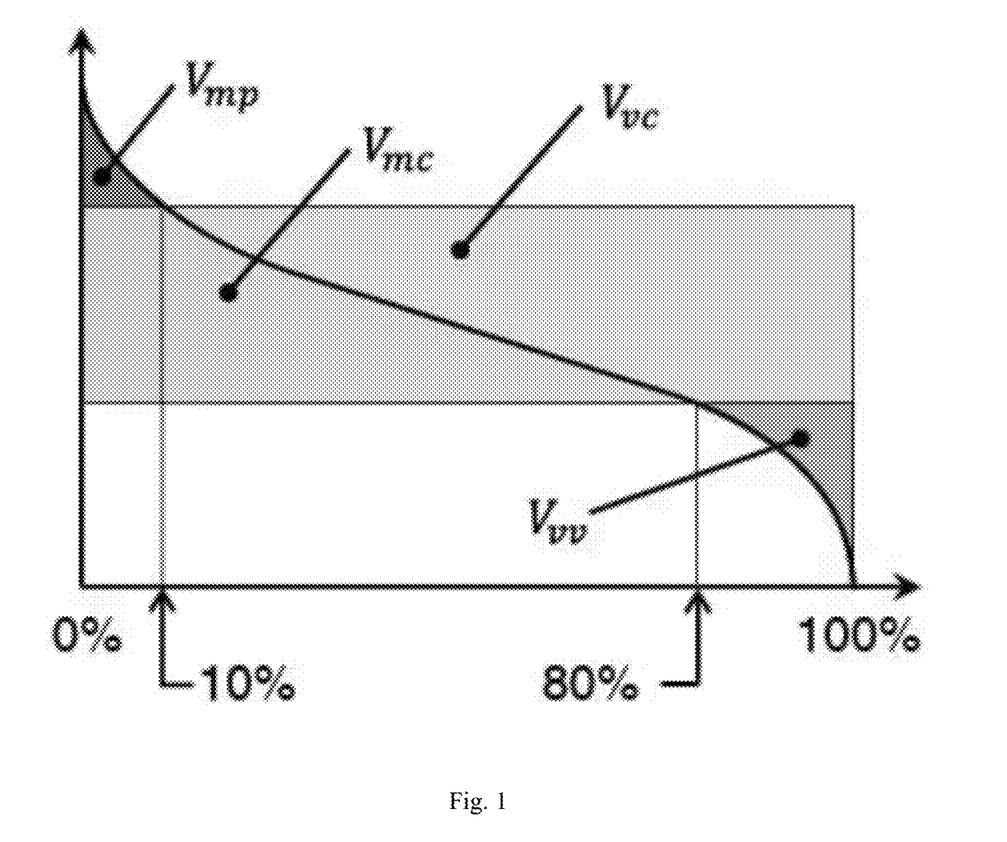
FIG. 1 is a schematic view of the disclosure according to an applicable surface core void volume.

The term "surface core void volume (Vvc)" used herein refers to the difference between the void volume of bearing area ratio p % and the void volume of bearing area ratio q % and is defined by ISO 25178:2012. The sizes of the core portion, protruding peak portion, and protruding trough portion can be quantified with volume parameters. As shown in FIG. 1, Vmp denotes the volume of the protruding peak portion, Vmc denotes the volume of the core portion, Vvc denotes the capacity of the core portion space, and Vvv denotes the bearing area ratio of the protruding trough portion. In FIG. 1, for example, the range 10% to 80% is specified to be the interval of the core portion. The first EVOH resin particle has a Vvc of 0.002~14 $\mu m^3/\mu m^2$, for example, 0.002, 0.005, 0.010, 0.050, 0.100, 0.500, 1, 2, 3, 4, 5, 6, 7, 8, 9, 10, 11, 12, 13 or 14. The second EVOH resin particle has a Vvc of 0.010~48 $\mu m^3/\mu m^2$, for example, 0.010, 0.050, 0.100, 0.500, 1, 5, 10, 15, 20, 25, 30, 35, 40, 45, 46, 47 or 48. In a preferred embodiment of the disclosure, the second EVOH resin particle has a greater Vvc than the first EVOH resin particle.

According to some embodiments of the disclosure, the first EVOH resin particle has a melting point of 135~179° C., for example, 135, 140, 145, 150, 155, 160, 165, 170, 175 or 179° C. In another aspect, the second EVOH resin particle has a melting point of 180~198° C., for example, 180, 182, 184, 186, 188, 190, 192, 194, 196 or 198° C.

According to some embodiments of the disclosure, the first EVOH resin particle has an ethylene content of around 36~50 mole %, for example, 36, 38, 40, 42, 44, 46, 48 or 50 mole %. In another aspect, the second EVOH resin particle has an ethylene content of 20~35 mole %, for example, 20, 21, 23, 25, 27, 29, 31, 33 or 35 mole %.

Furthermore/alternatively, the EVOH has a saponification degree of 90 mole % or higher, preferably 95 mole % or higher, preferably 97 mole % or higher, and preferably 99.5 mole % or higher.

The expression "the EVOH particle" used herein implies the form and/or shape of one or more particles formed when the EVOH resin undergoes pelletization; although the formation of one or more EVOH particles by pelletization is expressly described herein, the EVOH particle can be processed to take on the shape of a bead, a cube, a fragment, a shaving or the like according to the disclosure. According to some embodiments of the disclosure, the EVOH resin particle is cylindrical, elliptic cylindrical, prismoidal, spherical, ellipsoidal or biconvex-disk-shaped (corresponding to go-shape) in shape and has a major axis or height of 1~5 mm, for example, 1, 2, 3, 4 or 5 mm, and a minor axis of 1~5 mm, for example, 1, 2, 3, 4 or 5 mm. The term "major axis/height" used herein means the longest outer diameter of an object whose surface is defined by a closed curved surface. The "minor axis" is perpendicular to the "major axis/height" and means the shortest diameter of a cross section with the maximum area. The aforesaid expression "an object whose surface is defined by a closed curved surface" can be regarded as an object whose surface is integrally formed of a curved surface, an object being defined by multiple mutually-crossing surfaces and thus having no corners, or an object having no rectangular cross sections wherever they are.

When the EVOH resin particle is cylindrical or elliptic cylindrical, its height falls within the range of 1~5 mm, for example, 1.5~5.0 mm, 1.7~5.0 mm, 2.2~5.0 mm, 2.4~5.0 mm, 2.6~5.0 mm, 2.8~5.0 mm, 3.0~5.0 mm, 3.2~5.0 mm, 3.4~5.0 mm, 3.6~5.0 mm, 3.8~5.0 mm, 4.0~5.0 mm, 1.7~4.5 mm, 1.7~4.4 mm, 1.7~4.2 mm, 1.7~4.0 mm, 1.7~3.8 mm, 1.7~3.6 mm, 1.7~3.4 mm, 1.7~3.2 mm, or 1.7~3.0 mm, and its minor axis falls within the range of 1~5 mm, for example, 1.5~5.0 mm, 1.7~5.0 mm, 2.2~5.0 mm, 2.4~5.0 mm, 2.6~5.0 mm, 2.8~5.0 mm, 3.0~5.0 mm, 3.2~5.0 mm, 3.4~5.0 mm, 3.6~5.0 mm, 3.8~5.0 mm, 4.0~5.0 mm, 1.7~4.5 mm, 1.7~4.4 mm, 1.7~4.2 mm, 1.7~4.0 mm, 1.7~3.8 mm, 1.7~3.6 mm, 1.7~3.4 mm, 1.7~3.2 mm, or 1.7~3.0 mm.

When the EVOH particle is spherical, ellipsoidal or biconvex-disk-shaped, its major axis falls within the range of 1~5 mm, for example, 1.5~5.0 mm, 2.2~5.0 mm, 2.4~5.0 mm, 2.6~5.0 mm, 2.8~5.0 mm, 3.0~5.0 mm, 3.2~5.0 mm, 3.4~5.0 mm, 3.6~5.0 mm, 3.8~5.0 mm, 4.0~5.0 mm, 2.0~4.5 mm, 2.0~4.4 mm, 2.0~4.2 mm, 2.0~4.0 mm, 2.0~3.8 mm, 2.0~3.6 mm, 2.0~3.4 mm, 2.0~3.2 mm, or 2.0~3.0 mm, and its minor axis falls within the range of 1~5 mm, for example, 1.5~5.0 mm, 1.8~4.6 mm, 2.4~4.6 mm, 2.6~4.6 mm, 2.8~4.6 mm, 3.0~4.6 mm, 3.2~4.6 mm, 3.4~4.6 mm, 3.6~4.6 mm, 3.8~4.6 mm, 4.0~4.6 mm, 1.6~4.5 mm, 1.6~4.4 mm, 1.6~4.2 mm, 1.6~4.0 mm, 1.6~3.8 mm, 1.6~3.6 mm, 1.6~3.4 mm, 1.6~3.2 mm, or 1.6~3.0 mm.

According to some embodiments of the disclosure, the ratio by weight percentage of the first EVOH resin particle to the second EVOH resin particle ranges from 5:95 to 75:25 and is, for example, 5:95, 15:85, 25:75, 35:65, 45:55, 55:45, 65:35 or 75:25.

According to some embodiments of the disclosure, in some situations, the EVOH resin particle composition comprises boron compound and/or boric acid and/or cinnamic acid and/or alkali metal and/or conjugated polyene and/or lubricant and/or alkaline earth metal. The aforementioned substances improve the properties of the EVOH resin particle composition.

According to some embodiments of the disclosure, the EVOH resin particle composition comprises a boron compound with a boron content of 5 to 550 ppm. In some situations, the boron content of the EVOH resin particle composition depends on the total weight of the EVOH resin particle composition which falls within the range of 10 to 450 ppm, 10 to around 400 ppm, 10 to around 350 ppm, 10 to around 300 ppm, 10 to around 275 ppm, 10 to around 250 ppm, 10 to around 225 ppm, 10 to around 200 ppm, 10 to around 175 ppm, around 20 to 450 ppm, around 20 to around 400 ppm, around 20 to around 350 ppm, around 20 to around 300 ppm, around 20 to around 275 ppm, around 20 to around 250 ppm, around 20 to around 225 ppm, around 20 to around 200 ppm, around 20 to around 175 ppm, around 60 to 450 ppm, around 60 to around 400 ppm, around 60 to around 350 ppm, around 60 to around 300 ppm, around 60 to around 275 ppm, around 60 to around 250 ppm, around 60 to around 225 ppm, around 60 to around 200 ppm, around 60 to around 175 ppm, around 100 to 450 ppm, around 100 to around 400 ppm, around 100 to around 350 ppm, around 100 to around 300 ppm, around 100 to around 275 ppm, around 100 to around 250 ppm, around 100 to around 225 ppm, around 100 to around 200 ppm, around 100 to around 175 ppm, around 140 to 450 ppm, around 140 to around 400 ppm, around 140 to around 350 ppm, around 140 to around 300 ppm, around 140 to around 275 ppm, around 140 to around 250 ppm, around 140 to around 225 ppm, around 140 to around 200 ppm, around 180 to around 450 ppm, around 180 to around 400 ppm, around 180 to around 350 ppm, around 180 to around 300 ppm, around 180 to around 275 ppm, around 180 to around 250 ppm, around 180 to around 225 ppm, around 220 to 450 ppm, around 220 to around 400 ppm, around 220 to around 350 ppm, around 220 to around 300 ppm, or around 220 to around 275 ppm. When the boron content of the EVOH resin particle composition falls within a specific range, it enhances the binding adhesiveness of the EVOH resin particle composition and reduces the chance that the EVOH resin particle composition will adhere to a screw, or removes the EVOH from the screw, to thereby attain the self-cleansing capability of materials, further improving film thickness uniformity. In a preferred embodiment of the disclosure, in addition to a boron compound, the EVOH resin particle composition further comprises cinnamic acid, alkali metal, conjugated polyene, alkaline earth metal, a salt thereof and/or a mixture thereof. The substances are commonly found in EVOH resin particle compositions to enhance the properties thereof. When the aforesaid compounds with a conjugated polyene structure each account for 1~30000 ppm of the EVOH resin particle composition of a unit weight, they further inhibit after-heating coloring to thereby enhance thermal stability. If each unit weight of the EVOH resin composition comprises 10~550 ppm (calculated by metal conversion) of the alkali metal compound or alkaline earth metal compound, operation can last longer to enhance the formation process. The aforesaid concentration/content falls within any one of the following ranges as needed: 10~550 ppm, around 10~500 ppm, around 10~450 ppm, around 10~400 ppm, around 10~350 ppm, around 10~300 ppm, around 10~250 ppm, around 10~200 ppm, around 10~150 ppm, around 10~100 ppm, around 10~50 ppm, around 50~550 ppm, around 50~500 ppm, around 50~450 ppm, around 50~400 ppm, around 50~350 ppm, around 50~300 ppm, around 50~250 ppm, around 50~200 ppm, around 50~150 ppm, around 50~100 ppm, around 100~550 ppm, around 100~500 ppm, around 100~450 ppm, around 100~400 ppm, around 100~350 ppm, around 100~300 ppm, around 100~250 ppm, around 100~200 ppm, around 100~150 ppm, around 200~550 ppm, around 200~500 ppm, around 200~450 ppm, around 200~400 ppm, around 200~350 ppm, around 200~300 ppm, around 200~250 ppm, around 300~550 ppm, around 300~500 ppm, around 300~450 ppm, around 300~400 ppm, around 300~350 ppm, around 400~550 ppm, around 400~500 ppm, around 400~450 ppm, and around 500~550 ppm.

According to some embodiments of the disclosure, the boron compound includes boric acid or its metal salts. Examples of the metal salts include but are not limited to calcium borate, cobalt borate, zinc borate (for example, zinc tetraborate, zinc metaborate), potassium aluminum borate, ammonium borate (for example, ammonium metaborate, ammonium tetraborate, ammonium pentaborate, ammonium octaborate), cadmium borate (for example, cadmium orthoborate, cadmium tetraborate), potassium borate (for example, potassium metaborate, potassium tetraborate, potassium pentaborate, potassium hexaborate, potassium octaborate), silver borate (for example, silver metaborate, silver tetraborate), copper borate (for example, copper(II) borate, copper metaborate, copper tetraborate), sodium borate (for example, sodium metaborate, sodium diborate, sodium tetraborate, sodium pentaborate, sodium hexaborate, sodium octaborate), lead borate (for example, lead metaborate, lead hexaborate), nickel borate (for example, nickel orthoborate, nickel diborate, nickel tetraborate, nickel octaborate borate), barium borate (for example, barium orthoborate, barium metaborate, barium diborate, barium tetraborate), bismuth borate, magnesium borate (for example, magnesium orthoborate, magnesium diborate, magnesium metaborate, trimagnesium tetraborate, pentamagnesium tetraborate), manganese borate (for example, manganese(I) borate, manganese metaborate, manganese tetraborate), lithium borate (for example, lithium metaborate, lithium tetraborate, lithium pentaborate), a salt thereof or a combination thereof. It includes borate minerals, such as borax, kainite, inyoite, kotoite, szaibelyite/suanite, szaibelyite. Preferably, it includes borax, boric acid and sodium borate (for example, sodium metaborate, sodium diborate, sodium tetraborate, sodium pentaborate, sodium hexaborate and sodium octaborate).

According to some embodiments of the disclosure, the first EVOH resin particle has a surface core material volume (Vmc, as shown in FIG. 1) of around $0.001~12$ m$^3$/µm$^2$, for example, around $0.001~12$ µm$^3$/µm$^2$, around $0.010~12$ µm$^3$/µm$^2$, around $0.100~12$ µm$^3$/µm$^2$, around $1~12$ µm$^3$/µm$^2$, around $3~12$ µm$^3$/µm$^2$, around $3~10$ µm$^3$/µm$^2$, around $5~10$ µm$^3$/µm$^2$ or around $5~7$ µm$^3$/µm$^2$. In another aspect, the second EVOH resin particle has a surface core material volume (Vmc) of $0.022~55$ µm$^3$/µm$^2$, for example, around $0.220~55$ µm$^3$/µm$^2$, around $2.200~55$ µm$^3$/µm$^2$, around $22~55$ µm$^3$/µm$^2$, around $22~48$ m$^3$/µm$^2$, around $22~40$ µm$^3$/µm$^2$, around $22~36$ µm$^3$/µm$^2$, around $30~55$ µm$^3$/µm$^2$ or around $38~55$ µm$^3$/µm$^2$.

According to some embodiments of the disclosure, the first EVOH resin particle has a root-mean-square height (Sq) surface parameter of $0.001~25$ µm, for example, around $0.001~25$ µm, around $0.010~25$ µm, around $0.100~25$ µm, around $1~25$ µm, around $1~23.30$ µm, around $1~20$ µm, around $1~15$ µm, around $5~15$ µm or around $7~10$ µm. In another aspect, the second EVOH resin particle has a root-mean-square height (Sq) surface parameter of $0.020~65$ µm, for example, around $0.020~65$ µm, around $0.200~65$ μm, around 2~65 μm, around 2~61.30 μm, around 10~61.30 μm, around 20~50 μm, around 25~40 μm, around 30~40 μm or around 30~36 μm.

Please refer to ISO 25178:2012 for the definition of the term "root-mean-square height (Sq) surface parameter" used herein, it can be regarded as the root-mean-square value of the distance (Z-axis distance, i.e., height) between a standard surface and each point on an outline surface within a sampling range and is equivalent to the standard deviation of the height of the object.

According to some embodiments of the disclosure, the first EVOH resin particle has a surface maximum height (Sz) surface parameter of 0.030~28 μm, for example, around 0.300~28 μm, around 0.300~25 μm, around 1~28 μm, around 1~25 μm, around 1~23 μm, around 1~20 μm, around 1~15 μm, around 5~15 μm or around 7~10 μm. In another aspect, the second EVOH resin particle has a surface maximum height (Sz) surface parameter of 0.120~65 μm, for example, around 0.120~65 μm, around 1.200~65 μm, around 2~65 μm, around 2~61.30 μm, around 10~61.30 μm, around 20~50 μm, around 25~40 μm, around 30~40 μm or around 30~36 μm.

Please refer to ISO 25178:2012 for the definition of the term "surface maximum height (Sz) surface parameter" used herein, it can be regarded as the distance (Z-axis distance, i.e., height) between the maximum peak and the maximum trough relative to a standard surface within a sampling range.

According to some embodiments of the disclosure, the first EVOH resin particle has a core height difference (Sk) surface parameter of 0.010~25 μm, for example, around 0.100~25 μm, around 1~25 μm, around 1~23 μm, around 1~20 μm, around 1~15 μm, around 5~15 μm or around 7~10 μm. In another aspect, the second EVOH resin particle has a core height difference (Sk) surface parameter of 0.030~65 μm, for example, around 0.300~65 μm, around 1~65 μm, around 2~65 μm, around 3~61.30 μm, around 10~61.30 μm, around 20~50 μm, around 25~40 μm, around 30~40 μm or around 30~36 μm.

Please refer to ISO 25178:2012 for the definition of the term "core height difference (Sk) surface parameter" used herein, it can be regarded as the difference obtained by subtracting the minimum height from the maximum height within a core portion range.

According to some embodiments of the disclosure, the first EVOH resin particle has a linear arithmetic mean height (Ra) surface parameter of 0.001~0.990 μm, for example, around 0.001~0.990 μm, around 0.001~0.700 μm, around 0.001~0.500 μm, around 0.001~0.300 μm, around 0.010~0.100 μm, around 0.050~0.990 μm, around 0.050~0.700 μm, around 0.050~0.500 μm, around 0.050~0.300 μm or around 0.050~0.100 μm. In another aspect, the second EVOH resin particle has a linear arithmetic mean height (Ra) surface parameter of 0.001~0.990 μm, for example, around 0.010~0.990 μm, around 0.010~0.700 μm, around 0.010~0.500 μm, around 0.010~0.300 μm, around 0.010~0.100 μm, around 0.050~0.990 μm, around 0.050~0.700 μm, around 0.050~0.500 μm, around 0.050~0.300 μm or around 0.050~0.100 μm.

Please refer to JIS B 0601 for the definition of the term "linear arithmetic mean height (Ra) surface parameter" used herein, it is a parameter for defining surface roughness and can be regarded as the average absolute value of an outline curve on a standard length.

According to some embodiments of the disclosure, the first EVOH resin particle has a linear maximum height (Rz) surface parameter of 0.0010~9.9000 μm, for example, around 0.0010~9 μm, around 0.0010~7 μm, around 0.0010~5 μm, around 0.0100~3 m, around 0.0500~5 μm, around 0.0500~3 μm, around 0.0500~1 μm or around 0.0500~0.0800 μm. In another aspect, the second EVOH resin particle has a linear maximum height (Rz) surface parameter of 0.0010~9.9000 μm, for example, around 0.0800~9 μm, around 0.1000~9 μm, around 0.1500~9 μm, around 0.1500~7 μm, around 0.5000~5 μm, around 0.5000~2.5000 μm or around 1~2.5000 μm.

Please refer to JIS B 0601 for the definition of the term "linear maximum height (Rz) surface parameter" used herein, it is a parameter for defining surface roughness and can be regarded as the distance between the highest peak and the lowest trough of an outline curve relative to a standard length.

In another aspect, the disclosure provides an ethylene-vinyl alcohol copolymer film formed from the EVOH resin particle composition. Specifically speaking, the ethylene-vinyl alcohol copolymer film is a single-layer thin-film.

In another aspect, the disclosure provides a multilayer structure, comprising: (a) at least one layer of the ethylene-vinyl alcohol copolymer film formed from the EVOH resin particle composition; (b) at least one layer of a polymer layer; and (c) at least one layer of a binding layer.

According to some embodiments of the disclosure, the polymer layer is one selected from the group consisting of a low-density polyethylene layer, polyethylene grafted maleic anhydride layer, polypropylene layer and nylon layer, and the binding layer is a tie layer, for example, ARKEMA OREVAC 18729 manufactured by ARKEMA. Specifically speaking, the layers of the multilayer structure are arranged in the following order: a polymer layer, binding layer, ethylene-vinyl alcohol copolymer film, binding layer and polymer layer. According to some embodiments of the disclosure, the polymer layer has a thickness of 100~500 μm, preferably 200~400 μm, more preferably 300 μm, the binding layer has a thickness of 10~40 μm, preferably 20~30 μm, more preferably 25 μm, and the ethylene-vinyl alcohol copolymer film has a thickness of 20~80 μm, more preferably 40~60 μm, and more preferably 50 μm.

In the absence of any limitations imposed by any theory, the surface core void volume Vvc 10%-80% accounts for a great proportion of the core region and thus is the main factor in friction, affecting the melting and mixing of the first EVOH resin particle and second EVOH resin particle. Given a small Vvc, the first EVOH resin particle with a low melting point has small surface friction between particles, generates low frictional heat, melts late, and manifests a backwardly-shifted melting zone. Given a large Vvc, the second EVOH resin particle with a high melting point has great surface friction between particles, generates high frictional heat, melts earlier, and manifests a forwardly-shifted melting zone. Therefore, the composition comprising two different EVOH particles with controlled Vvc ranges exhibits close particle melting zones and satisfactory mixability and thereby enhances the thermoformability of the EVOH composition.

Embodiments

Nonrestrictive embodiments for all aspects of the disclosure are provided below to describe all the aspects of the disclosure and the advantages they achieve. The EVOH formula of each example and each comparative example comprises at least two ingredients. The two ingredients of the EVOH resin particle composition of each example and each comparative example are two types of EVOH resin particles.

Preparation of EVOH Resin Particle Composition

A nonrestrictive preparation method for the EVOH resin particle composition is provided and described below. According to a method similar to the method disclosed below, five EVOH resin particle compositions of nonrestrictive embodiments (examples EVOH 1-5) and six EVOH resin particle compositions of comparative examples (comparative examples EVOH 1-6) are prepared. However, a specific method of preparing examples EVOH 1-5 and comparative examples EVOH 1-6 is usually different from the method disclosed below in one or more aspects.

First EVOH Resin Particle in Example 1

500 kg of vinyl acetate, 100 kg of methanol, 0.0585 kg of acetyl peroxide, and 0.015 kg of citric acid are introduced into a polymerizer with cooling coils. Then, the polymerizer is temporarily filled with nitrogen gas. Next, ethylene is introduced and compressed until the ethylene pressure reaches 45 kg/cm$^2$. In the ethylene-pressurized environment, the mixture in the polymerizer is stirred and heated up to 67° C. to start polymerization. After the polymerization has been occurring for six hours, 0.0525 kg of conjugated polyene sorbate functioning as a polymerization inhibitor is added into the polymerizer as soon as the polymerization rate reaches 60%. Thus, an ethylene-vinyl acetate copolymer with a content of 44 mole % of ethylene structural units is obtained. After that, a reaction solution that contains ethylene-vinyl acetate copolymer is supplied to a distillation column, and methanol vapor is introduced into the distillation column via the lower portion thereof to eliminate unreacted vinyl acetate, so as to obtain a methanol solution of ethylene vinyl acetate copolymer.

In this example, ethylene-vinyl acetate copolymer (hereinafter referred to as "EVAC" polymer) formed by the polymerization of ethylene monomer and vinyl acetate monomer undergoes saponification at a saponification degree of 99.5% to form EVOH. Then, EVOH is dissolved in an aqueous solution of alcohol with a methanol-to-water ratio of 70:30. The solution of EVOH/methanol/water is left to stand still at 60° C. for 1 hour to promote the dissolution of EVOH in the solution of EVOH/methanol/water. The solution of EVOH/methanol/water has a solid content of 41 wt %.

Then, the solution of methanol, water and EVOH undergoes pelletization by strip cutting. Specifically speaking, with a pump, the solution of methanol, water and EVOH is delivered to a feeding pipe at a flow rate of 120 L/min and then introduced into an opening portion mold with a round shape and a diameter of 0.5 mm to squeeze the EVOH solution into a water/methanol mixture solution (with a water/methanol quality ratio of 9/1) having a temperature of 5° C., being thread-shaped at a precipitation outlet and being severed by a rotating knife with a rotation speed of 500 rpm, so as to produce EVOH particles. EVOH particles are cooled down with circulating condensation water of a temperature of 5° C. Then, the EVOH particles undergo centrifugation to release EVOH particles. The released EVOH particles are rinsed with water. The centrifugation and rinsing step is performed at a first-instance dehydrator rotation speed of 5000 rpm, at a water to wet particle ratio of 10 during delivery, with an open-style delivery-dedicated centrifugal pump, at a delivery pump rotation speed of 3000 rpm, at a water to wet particle weight ratio of 5 during water rinsing, and at a water flow speed of 2 m/min during water rinsing. The second-instance dehydrator rotation speed is 2000 rpm. After that, the EVOH particles are immersed in a boric acid/sodium acetate solution, at a concentration adjusted according to a boron content and an alkali metal content of an end product. Finally, the drying step is performed in three phases with different dryers to obtain EVOH cylindrical particles with a height of 5 mm and a minor axis of 1 mm each.

The three phases of drying are herein described. The first phase of drying uses a belt dryer in carrying out drying at 80° C. for 2 hours. The second phase of drying uses a belt dryer in carrying out drying at 100° C. for 20 hours. The third phase of drying uses a fluid dryer in carrying out drying at 120° C. for 20 hours. Finally, the particles are delivered and stored. The delivery occurs in the condition as follows: air-based delivery, a pipeline diameter of 6 inches, four bends, a pipeline length of 30 μm, and a delivery speed of 40 m/min.

Second EVOH Resin Particle of Example 1

The preparation of the second EVOH resin particle of example 1 is similar to the preparation of the first EVOH resin particle of example 1 except for the following differences: performing saponification on ethylene-vinyl acetate copolymer (hereinafter referred to as "EVAC") with an ethylene content of 32 mole % at a saponification degree 99.5% to prepare EVOH polymer, allowing the EVOH polymer to be introduced into an opening portion mold with a round shape and a diameter of 2 mm to squeeze the EVOH solution into a water/methanol mixture solution (with a water/methanol quality ratio of 9/1) having a temperature of 5° C., being thread-shaped at a precipitation outlet and being severed by a rotating knife with a rotation speed of 2000 rpm, so as to produce EVOH particles. Then, the drying step is performed in three phases with different dryers to obtain EVOH cylindrical particles with a height of 2 mm and a minor axis of 3 mm.

The three phases of drying are herein described. The first phase of drying uses a microwave dryer in carrying out drying at 70° C. for 3 hours. The second phase of drying uses a cylindrical stirring dryer in carrying out drying at 110° C. for 20 hours. The third phase of drying uses a box dryer in carrying out drying at 115° C. for 30 hours.

For the purpose of carrying out a preparation process later, the first EVOH resin particle and the second EVOH resin particle are further mixed at a ratio by weight percentage of 25:75 wt %, with a conical screw mixer (Model No.: CM-2, purchased from She Hui Machinery Co., Ltd.), at a rotation speed of 10 rpm for 5 minutes continuously, so as to prepare the EVOH resin particle composition of example 1.

First and Second EVOH Resin Particles of Example 2

First and second EVOH methanol aqueous solutions for use in example 2 are prepared with a preparation process similar to that for preparing EVOH resin particles of example 1. However, the preparation of the first EVOH methanol aqueous solution of example 2 has the differences as follows: an ethylene content of 48 mole %, and the pelletization step that entails performing pelletization on the solution of methanol, water and EVOH through underwater pelletization. Specifically speaking, with a pump, the solution of methanol, water and EVOH is delivered to a feeding pipe at a flow rate of 120 L/min and then delivered to an input pipe with a diameter of 1 mm before being severed by a rotating knife with a rotation speed of 1500 rpm to obtain EVOH particles. The EVOH particles are cooled down with circulating condensation water of a temperature of 5° C. Then, the EVOH particles undergo centrifugation to release the EVOH particles. The released EVOH particles are rinsed with water. Next, the second instance of the centrifugation-based dehydration step is carried out. After that, the EVOH particles are immersed in a boric acid/sodium acetate solution, followed by performing a drying step and adding calcium stearate to obtain the end product of the EVOH resin particles. The three phases of drying are herein described. The first phase of drying uses a box dryer in carrying out drying at 60° C. for 4 hours. The second phase of drying uses a microwave dryer in carrying out drying at 80° C. for 15 hours. The third phase of drying uses a fluid dryer in carrying out drying at 110° C. for 30 hours. The drying step produces EVOH ellipsoidal particles with a major axis of 3 mm and a minor axis of 2 mm each. In another aspect, the preparation of the second EVOH methanol aqueous solution of example 2 has the differences as follows: an ethylene content of 27 mole %, a preparation process similar to that for preparing the first EVOH resin particle of example 2, and an input pipe with a diameter of 2 mm. The three phases of drying are herein described. The first phase of drying uses a fluid dryer in carrying out drying at 60° C. for 3 hours. The second phase of drying uses a belt dryer in carrying out drying at 70° C. for 30 hours. The third phase of drying uses a belt dryer in carrying out drying at 100° C. for 30 hours. The drying step produces EVOH spherical particles with a minor axis of 3 mm each. Furthermore, the first EVOH resin particle and second EVOH resin particle are further mixed at a ratio by weight percent of 10:90 wt % to prepare the EVOH resin particle composition of example 2.

First and Second EVOH Resin Particles of Example 3

First and second EVOH methanol aqueous solutions for use in example 3 are prepared with a preparation process similar to that for preparing the EVOH resin particles of example 2. However, the preparation of the first EVOH methanol aqueous solution of example 3 has the differences as follows: an ethylene content of 38 mole %, and the pelletization step that entails performing pelletization on the solution of methanol, water and EVOH through underwater pelletization. Specifically speaking, with a pump, the solution of methanol, water and EVOH is delivered to a feeding pipe at a flow rate of 120 L/min and then delivered to an input pipe with a diameter of 0.5 mm before being severed by a rotating knife with a rotation speed of 3000 rpm to obtain EVOH particles. The EVOH particles are cooled down with circulating condensation water of a temperature of 5° C. Then, the EVOH particles undergo centrifugation to release the EVOH particles. The released EVOH particles are rinsed with water. Next, the second instance of the centrifugation-based dehydration step is carried out. After that, the EVOH particles are immersed in a boric acid/sodium acetate solution, followed by performing a drying step and adding calcium stearate to obtain the end product of the EVOH resin particles. The three phases of drying are herein described. The first phase of drying uses a belt dryer in carrying out drying at 75° C. for 2 hours. The second phase of drying uses an aeration rotary dryer in carrying out drying at 80° C. for 15 hours. The third phase of drying uses an infrared dryer in carrying out drying at 115° C. for 20 hours. The drying step produces EVOH spherical particles with a minor axis of 1 mm each. In another aspect, the preparation of the second EVOH methanol aqueous solution of example 3 has the differences as follows: an ethylene content of 29 mole %, a preparation process similar to that for preparing the EVOH resin particles of example 1, a strip-cutting opening mold with a diameter of 4 mm, and a rotating knife with a rotation speed of 3000 rpm. The three phases of drying are herein described. The first phase of drying uses a microwave dryer in carrying out drying at 80° C. for 2 hours. The second phase of drying uses a fluid dryer in carrying out drying at 100° C. for 20 hours. The third phase of drying uses a cylindrical stirring dryer in carrying out drying at 105° C. for 15 hours. The drying step produces EVOH cylindrical particles with a height of 1 mm and a minor axis of 5 mm each. Furthermore, the first EVOH resin particle and second EVOH resin particle are further mixed at a ratio by weight percentage of 50:50 wt % to prepare the EVOH resin particle composition of example 3.

First and Second EVOH Resin Particle of Example 4

First and second EVOH methanol aqueous solutions for use in example 4 are prepared with a preparation process similar to that for preparing the EVOH resin particles of example 2. However, the preparation of the first EVOH methanol aqueous solution of example 4 has the differences as follows: an ethylene content of 48 mole %, and the pelletization step that entails performing pelletization on the solution of methanol, water and EVOH through underwater pelletization. Specifically speaking, with a pump, the solution of methanol, water and EVOH is delivered to a feeding pipe at a flow rate of 120 L/min and then delivered to an input pipe with a diameter of 0.5 mm before being severed by a rotating knife with a rotation speed of 500 rpm to obtain EVOH particles. The EVOH particles are cooled down with circulating condensation water of a temperature of 5° C. Then, the EVOH particles undergo centrifugation to release the EVOH particles. The released EVOH particles are rinsed with water. Next, the second instance of the centrifugation-based dehydration step is carried out. After that, the EVOH particles are immersed in a boric acid/sodium acetate solution, followed by performing a drying step and adding calcium stearate to obtain the end product of the EVOH resin particles. The three phases of drying are herein described. The first phase of drying uses a belt dryer in carrying out drying at 80° C. for 3 hours. The second phase of drying uses a microwave dryer in carrying out drying at 90° C. for 20 hours. The third phase of drying uses an aeration rotary dryer in carrying out drying at 110° C. for 25 hours. The drying step produces EVOH ellipsoidal particles with a major axis of 5 mm and a minor axis of 1 mm each. In another aspect, the preparation of the second EVOH methanol aqueous solution of example 4 has the differences as follows: an ethylene content of 32 mole %, a preparation process similar to that for preparing the first EVOH resin particle of example 1, a strip-cutting opening mold with a diameter of 2 mm, and a rotating knife with a rotation speed of 1500 rpm. The three phases of drying are herein described. The first phase of drying uses a fluid dryer in carrying out drying at 70° C. for 2 hours. The second phase of drying uses an infrared dryer in carrying out drying at 90° C. for 20 hours. The third phase of drying uses a box dryer in carrying out drying at 100° C. for 30 hours. The drying step produces EVOH cylindrical particles with a height of 3 mm and a minor axis of 3 mm each. Furthermore, the first EVOH resin particle and second EVOH resin particle are further mixed at a ratio by weight percentage of 15:85 wt % to prepare the EVOH resin particle composition of example 4.

First and Second EVOH Resin Particles of Example 5

First and second EVOH methanol aqueous solutions for use in example 5 are prepared with a preparation process similar to that for preparing the EVOH resin particles of example 2. However, the preparation of the first EVOH methanol aqueous solution of example 5 has the differences as follows: an ethylene content of 38 mole %, and the pelletization step that entails performing pelletization on the solution of methanol, water and EVOH through underwater pelletization. Specifically speaking, with a pump, the solution of methanol, water and EVOH is delivered to a feeding pipe at a flow rate of 120 L/min and then delivered to an input pipe with a diameter of 1 mm before being severed by a rotating knife with a rotation speed of 1000 rpm to obtain EVOH particles. The EVOH particles are cooled down with circulating condensation water of a temperature of 5° C. Then, the EVOH particles undergo centrifugation to release the EVOH particles. The released EVOH particles are rinsed with water. Next, the second instance of the centrifugation-based dehydration step is carried out. After that, the EVOH particles are immersed in a boric acid/sodium acetate solution, followed by performing a drying step and adding calcium stearate to obtain the end product of the EVOH resin particles. The three phases of drying are herein described. The first phase of drying uses a fluid dryer in carrying out drying at 60° C. for 3 hours. The second phase of drying uses a belt dryer in carrying out drying at 100° C. for 10 hours. The third phase of drying uses a cylindrical stirring dryer in carrying out drying at 110° C. for 20 hours. The drying step produces EVOH ellipsoidal particles with a major axis of 4 mm and a minor axis of 2 mm each. In another aspect, the preparation of the second EVOH methanol aqueous solution of example 5 has the differences as follows: an ethylene content of 24 mole %, a preparation process similar to that for preparing the first EVOH resin particle of example 2, an input pipe with a diameter of 0.5 mm for use in cutting, and a rotating knife with a rotation speed of 1000 rpm for use in cutting. The three phases of drying are herein described. The first phase of drying uses an infrared dryer in carrying out drying at 70° C. for 2 hours. The second phase of drying uses an aeration rotary dryer in carrying out drying at 95° C. for 15 hours. The third phase of drying uses a fluid dryer in carrying out drying at 115° C. for 30 hours. The drying step produces EVOH ellipsoidal particles with a major axis of 4 mm and a minor axis of 1 mm each. Furthermore, the first EVOH resin particle and second EVOH resin particle are further mixed at a ratio by weight percentage of 35:65 wt % to prepare the EVOH resin particle composition of example 5.

First and Second EVOH Resin Particles of Comparative Example 1

First and second EVOH methanol aqueous solutions for use in comparative example 1 are prepared with a preparation process similar to that for preparing EVOH resin particles of example 2. However, the preparation of the first EVOH methanol aqueous solution of comparative example 1 has the differences as follows: an ethylene content of 44 mole %, and the pelletization step that entails performing pelletization on the solution of methanol, water and EVOH through underwater pelletization. Specifically speaking, with a pump, the solution of methanol, water and EVOH is delivered to a feeding pipe at a flow rate of 120 L/min and then delivered to an input pipe with a diameter of 2.5 mm before being severed by a rotating knife with a rotation speed of 1200 rpm to obtain EVOH particles. The EVOH particles are cooled down with circulating condensation water of a temperature of 5° C. Then, the EVOH particles undergo centrifugation to release the EVOH particles. The released EVOH particles are rinsed with water. Next, the second instance of the centrifugation-based dehydration step is carried out. After that, the EVOH particles are immersed in a boric acid/sodium acetate solution, followed by performing a drying step and adding calcium stearate to obtain the end product of the EVOH resin particles. The three phases of drying are herein described. The first phase of drying uses a belt dryer in carrying out drying at 80° C. for 1 hours. The second phase of drying uses a belt dryer in carrying out drying at 110° C. for 2 hours. The third phase of drying uses a microwave dryer in carrying out drying at 120° C. for 10 hours. The drying step produces EVOH spherical particles with a minor axis of 3.5 mm each. In another aspect, the preparation of the second EVOH methanol aqueous solution of comparative example 1 has the differences as follows: an ethylene content of 29 mole %, a preparation process similar to that for preparing the first EVOH resin particle of example 1, a strip-cutting opening mold with a diameter of 3.5 mm, and a rotating knife with a rotation speed of 500 rpm. The three phases of drying are herein described. The first phase of drying uses an infrared dryer in carrying out drying at 85° C. for 2 hours. The second phase of drying uses a box dryer in carrying out drying at 105° C. for 25 hours. The third phase of drying uses a microwave dryer in carrying out drying at 130° C. for 10 hours. The drying step produces EVOH cylindrical particles with a height of 5 mm and a minor axis of 4.5 mm each. Furthermore, the first EVOH resin particle and second EVOH resin particle are further mixed at a ratio by weight percent of 5:95 wt % to prepare the EVOH resin particle composition of comparative example 1.

First and Second EVOH Resin Particles of Comparative Example 2

First and second EVOH methanol aqueous solutions for use in comparative example 2 are prepared with a preparation process similar to that for preparing the EVOH resin particles of example 2. However, the preparation of the first EVOH methanol aqueous solution of comparative example 2 has the differences as follows: an ethylene content of 35 mole %, and the pelletization step that entails performing pelletization on the solution of methanol, water and EVOH through underwater pelletization. Specifically speaking, with a pump, the solution of methanol, water and EVOH is delivered to a feeding pipe at a flow rate of 120 L/min and then delivered to an input pipe with a diameter of 1 mm before being severed by a rotating knife with a rotation speed of 1500 rpm to obtain EVOH particles. The EVOH particles are cooled down with circulating condensation water of a temperature of 5° C. Then, the EVOH particles undergo centrifugation to release the EVOH particles. The released EVOH particles are rinsed with water. Next, the second instance of the centrifugation-based dehydration step is carried out. After that, the EVOH particles are immersed in a boric acid/sodium acetate solution, followed by performing a drying step and adding calcium stearate to obtain the end product of the EVOH resin particles. The three phases of drying are herein described. The first phase of drying uses an infrared dryer in carrying out drying at 80° C. for 4 hours. The second phase of drying uses a belt dryer in carrying out drying at 110° C. for 20 hours. The third phase of drying uses a microwave dryer in carrying out drying at 105° C. for 10 hours. The drying step produces EVOH ellipsoidal particles with a major axis of 3 mm and a minor axis of 2 mm each. In another aspect, the preparation of the second EVOH methanol aqueous solution of comparative example 2 has the differences as follows: an ethylene content of 24 mole %, a preparation process similar to that for preparing the EVOH resin particles of example 1, a strip-cutting opening mold with a diameter of 1 mm, and a rotating knife with a rotation speed of 1000 rpm. The three phases of drying are herein described. The first phase of drying uses a cylindrical stirring dryer in carrying out drying at 110° C. for 3 hours. The second phase of drying uses a fluid dryer in carrying out drying at 110° C. for 30 hours. The third phase of drying uses an aeration rotary dryer in carrying out drying at 120° C. for 50 hours. The drying step produces EVOH cylindrical particles with a height of 4 mm and a minor axis of 2 mm each. Furthermore, the first EVOH resin particle and second EVOH resin particle are further mixed at a ratio by weight percentage of 75:25 wt % to prepare the EVOH resin particle composition of comparative example 2.

First and Second EVOH Resin Particles of Comparative Example 3

First and second EVOH methanol aqueous solutions for use in comparative example 3 are prepared with a preparation process similar to that for preparing the EVOH resin particles of example 1. However, the preparation of the first EVOH methanol aqueous solution of comparative example 3 has the differences as follows: an ethylene content of 48 mole %, a preparation process similar to that for preparing the EVOH resin particles of example 1, a strip-cutting opening mold with a diameter of 3 mm, and a rotating knife with a rotation speed of 1700 rpm. The three phases of drying are herein described. The first phase of drying uses a fluid dryer in carrying out drying at 90° C. for 3 hours. The second phase of drying uses an aeration rotary dryer in carrying out drying at 100° C. for 25 hours. The third phase of drying uses a cylindrical stirring dryer in carrying out drying at 110° C. for 40 hours. The drying step produces EVOH cylindrical particles with a height of 2.5 mm and a minor axis of 4 mm each. In another aspect, the preparation of the second EVOH methanol aqueous solution of comparative example 3 has the differences as follows: an ethylene content of 32 mole %, a preparation process similar to that for preparing the EVOH resin particles of example 1, a strip-cutting opening mold with a diameter of 2 mm, and a rotating knife with a rotation speed of 1200 rpm. The three phases of drying are herein described. The first phase of drying uses a fluid dryer in carrying out drying at 80° C. for 4 hours. The second phase of drying uses an aeration rotary dryer in carrying out drying at 110° C. for 30 hours. The third phase of drying uses a fluid dryer in carrying out drying at 115° C. for 30 hours. The drying step produces EVOH cylindrical particles with a height of 3.5 mm and a minor axis of 3 mm each. Furthermore, the first EVOH resin particle and second EVOH resin particle are further mixed at a ratio by weight percentage of 15:85 wt % to prepare the EVOH resin particle composition of comparative example 3.

First and Second EVOH Resin Particles of Comparative Example 4

First and second EVOH methanol aqueous solutions for use in comparative example 4 are prepared with a preparation process similar to that for preparing the EVOH resin particles of example 2. However, the preparation of the first EVOH methanol aqueous solution of comparative example 4 has the differences as follows: an ethylene content of 38 mole %, and the pelletization step that entails performing pelletization on the solution of methanol, water and EVOH through underwater pelletization. Specifically speaking, with a pump, the solution of methanol, water and EVOH is delivered to a feeding pipe at a flow rate of 120 L/min and then delivered to an input pipe with a diameter of 0.5 mm before being severed by a rotating knife with a rotation speed of 3000 rpm to obtain EVOH particles. The EVOH particles are cooled down with circulating condensation water of a temperature of 5° C. Then, the EVOH particles undergo centrifugation to release the EVOH particles. The released EVOH particles are rinsed with water. Next, the second instance of the centrifugation-based dehydration step is carried out. After that, the EVOH particles are immersed in a boric acid/sodium acetate solution, followed by performing a drying step and adding calcium stearate to obtain the end product of the EVOH resin particles. The three phases of drying are herein described. The first phase of drying uses a box dryer in carrying out drying at 60° C. for 2 hours. The second phase of drying uses a cylindrical stirring dryer in carrying out drying at 80° C. for 30 hours. The third phase of drying uses a microwave dryer in carrying out drying at 105° C. for 20 hours. The drying step produces EVOH spherical particles with a minor axis of 1 mm each. In another aspect, the preparation of the second EVOH methanol aqueous solution of comparative example 4 has the differences as follows: an ethylene content of 27 mole %, a preparation process similar to that for preparing the first EVOH resin particle of example 2, an input pipe with a diameter of 3 mm for use in cutting, and a rotating knife with a rotation speed of 1000 rpm for use in cutting. The three phases of drying are herein described. The first phase of drying uses a cylindrical stirring dryer in carrying out drying at 100° C. for 4 hours. The second phase of drying uses an aeration rotary dryer in carrying out drying at 90° C. for 40 hours. The third phase of drying uses a fluid dryer in carrying out drying at 110° C. for 30 hours. The drying step produces EVOH spherical particles with a minor axis of 4 mm each. Furthermore, the first EVOH resin particle and second EVOH resin particle are further mixed at a ratio by weight percentage of 10:90 wt % to prepare the EVOH resin particle composition of comparative example 4.

First and Second EVOH Resin Particles of Comparative Example 5

First and second EVOH methanol aqueous solutions for use in comparative example 5 are prepared with a preparation process similar to that for preparing the EVOH resin particles of example 2. However, the preparation of the first EVOH methanol aqueous solution of comparative example 5 has the differences as follows: an ethylene content of 44 mole %, and the pelletization step that entails performing pelletization on the solution of methanol, water and EVOH through underwater pelletization. Specifically speaking, with a pump, the solution of methanol, water and EVOH is delivered to a feeding pipe at a flow rate of 120 L/min and then delivered to an input pipe with a diameter of 2.5 mm before being severed by a rotating knife with a rotation speed of 1000 rpm to obtain EVOH particles. The EVOH particles are cooled down with circulating condensation water of a temperature of 5° C. Then, the EVOH particles undergo centrifugation to release the EVOH particles. The released EVOH particles are rinsed with water. Next, the second instance of the centrifugation-based dehydration step is carried out. After that, the EVOH particles are immersed in a boric acid/sodium acetate solution, followed by performing a drying step and adding calcium stearate to obtain the end product of the EVOH resin particles. The three phases of drying are herein described. The first phase of drying uses an infrared dryer in carrying out drying at 60° C. for 5 hours. The second phase of drying uses a belt dryer in carrying out drying at 80° C. for 10 hours. The third phase of drying uses an infrared dryer in carrying out drying at 105° C. for 20 hours. The drying step produces EVOH ellipsoidal particles with a major axis of 4 mm and a minor axis of 3.5 mm each. In another aspect, the preparation of the second EVOH methanol aqueous solution of comparative example 5 has the differences as follows: an ethylene content of 29 mole %, a preparation process similar to that for preparing the first EVOH resin particle of example 2, an input pipe with a diameter of 0.5 mm for use in cutting, and a rotating knife with a rotation speed of 1700 rpm for use in cutting. The three phases of drying are herein described. The first phase of drying uses a belt dryer in carrying out drying at 80° C. for 2 hours. The second phase of drying uses a fluid dryer in carrying out drying at 100° C. for 10 hours. The third phase of drying uses an infrared dryer in carrying out drying at 110° C. for 15 hours. The drying step produces EVOH ellipsoidal particles with a major axis of 2.5 mm and a minor axis of 1 mm each. Furthermore, the first EVOH resin particle and second EVOH resin particle are further mixed at a ratio by weight percentage of 20:80 wt % to prepare the EVOH resin particle composition of comparative example 5.

First and Second EVOH Resin Particles of Comparative Example 6

First and second EVOH methanol aqueous solutions for use in comparative example 6 are prepared with a preparation process similar to that for preparing EVOH resin particles of example 2. However, the preparation of the first EVOH methanol aqueous solution of comparative example 6 has the differences as follows: an ethylene content of 38 mole %, and the pelletization step that entails performing pelletization on the solution of methanol, water and EVOH through underwater pelletization. Specifically speaking, with a pump, the solution of methanol, water and EVOH is delivered to a feeding pipe at a flow rate of 120 L/min and then delivered to an input pipe with a diameter of 1.5 mm before being severed by a rotating knife with a rotation speed of 1700 rpm to obtain EVOH particles. The EVOH particles are cooled down with circulating condensation water of a temperature of 5° C. Then, the EVOH particles undergo centrifugation to release the EVOH particles. The released EVOH particles are rinsed with water. Next, the second instance of the centrifugation-based dehydration step is carried out. After that, the EVOH particles are immersed in a boric acid/sodium acetate solution, followed by performing a drying step and adding calcium stearate to obtain the end product of the EVOH resin particles. The three phases of drying are herein described. The first phase of drying uses a cylindrical stirring dryer in carrying out drying at 105° C. for 4 hours. The second phase of drying uses an aeration rotary dryer in carrying out drying at 110° C. for 30 hours. The third phase of drying uses a fluid dryer in carrying out drying at 105° C. for 40 hours. The drying step produces EVOH spherical particles with a minor axis of 2.5 mm each. In another aspect, the preparation of the second EVOH resin methanol aqueous solution of comparative example 6 has the differences as follows: an ethylene content of 32 mole %, a preparation process similar to that for preparing the first EVOH resin particle of example 2, an input pipe with a diameter of 0.5 mm for use in cutting, and a rotating knife with a rotation speed of 1000 rpm for use in cutting. The three phases of drying are herein described. The first phase of drying uses a box dryer in carrying out drying at 60° C. for 3 hours. The second phase of drying uses an aeration rotary dryer in carrying out drying at 100° C. for 20 hours. The third phase of drying uses a microwave dryer in carrying out drying at 110° C. for 30 hours. The drying step produces EVOH ellipsoidal particles with a major axis of 4 mm and a minor axis of 1 mm each. Furthermore, the first EVOH resin particle and second EVOH resin particle are further mixed at a ratio by weight percentage of 35:65 wt % to prepare the EVOH resin particle composition of comparative example 6.

The box dryer, belt dryer, microwave dryer and infrared dryer are "stationary dryers". The fluid dryer is an "disturbance dryer". The cylindrical stirring dryer and the aeration rotary dryer are "strongly disturbed dryers". The disturbance dryer and the strongly disturbed dryers are described briefly below.

The disturbance dryer operates to allow particles to move uni-directionally only or slightly. The fluid dryer is like a hot-air oven but generates stronger air current than the hot-air oven to drive particles upward mildly.

The strongly disturbed dryers operate to allow particles to move in at least two dimensions or move widely and violently. The cylindrical stirring dryer stirs particles under an external force to cause the particles to collide with each other in all directions. Collisions between particles are confined to the space defined by the wall of the aeration rotary dryer in operation.

Parameters Related to EVOH Resin Particles

Parameters related to the EVOH resin particles of the disclosure and techniques for assessing/analyzing the parameters are described below.

Particle Surface Roughness

To assess/analyze the surface roughness of the EVOH resin particles in the aforesaid embodiments, it is desirable to place the EVOH resin particles flatly on a board to undergo measurement of the particle surface roughness. The measurement process entails eliminating whatever data associated with a tilting angle greater than 0.5 to ensure that the scanning planes are relatively horizontal (tilting angle=surface maximum height Sz/border length 129 μm of the analysis range). The required laser microscope is LEXT OLS5000-SAF manufactured by Olympus, producing images at an air temperature of 24±3° C. and a relative humidity of 63±3%. The filter in use is configured to operate in the "no filtering" state. The required light source has a wavelength of 405 nm. The objective lens is capable of 100× magnification (MPLAPON-100xLEXT). The optical zoom is set to 1.0×. The image area is set to be 129 μm×129 μm (The measurement of Rz is performed by focusing on the central axis in the image area.) The resolution is set to be 1024 pixels×1024 pixels. The numerical values of 100 particles are measured, and then the average is calculated. The parameters Vvc, Vmc, Sq, Sz and Sk are measured with related techniques set forth in ISO 25178:2012, whereas the parameters Ra and Rz are measured with related techniques set forth in JIS B 0601 (2001).

Ethylene Content Analysis

To assess/analyze the ethylene content of the EVOH resin particles in the aforesaid embodiments, the disclosure entails using a Raman spectrometer (manufactured by UniDRON) to measure the ethylene content of each EVOH resin particle at five points thereof randomly with a laser source having a wavelength of 473 nm and calculate the average, using the average as the ethylene content value of the EVOH resin particle samples.

Melting Point Analysis

The melting point of the EVOH resin particles is measured by the DSC Q200 device (TZERO TECHNOLOGIES, INC., with the lid (Tzero lid) being TA instrument T 170607, and the pan (Tzero pan) being TA instrument T 170620) with related techniques set forth in ISO 11357-3-2011.

In practice, in the absence of any limitations imposed by a specific theory, in the event of a large number of EVOH resin particles, only 100 EVOH resin particles may be selected to obtain individual ethylene content with a related technique of analysis of ethylene contents. Then, those EVOH resin particles which have an ethylene content of 35~48 mole % are allocated to the category of EVOH resin particles with a low melting point of around 135~179° C., whereas those EVOH resin particles which have an ethylene content of 24~34 mole % are allocated to the category of EVOH resin particles with a high melting point of around 180~198° C. Furthermore, 10 EVOH resin particles are randomly selected from each of the category of EVOH resin particles with a low melting point and the category of EVOH resin particles with a high melting point to calculate their surface roughness with a surface parameter assay technique and then determine their melting points with a melting point assay technique.

Preparation and Analysis of Single-Layer EVOH Film

With the technique described below, films are formed from EVOH resin particle compositions of examples 1~5 and comparative examples 1~6, respectively. The EVOH resin particle compositions of examples 1~5 and comparative examples 1~6 are fed to a single screw extruder (Model No.: ME25/5800V4; brand: OCS) to undergo extrusion in order to prepare single-layer thin-films. The films formed from the EVOH resin particle compositions of examples 1~5 and comparative examples 1~6 have a thickness of 20 μm each. The temperature of the extruder is set to 220° C., and the rotation frequency of the screw is set to 7 rpm (rotations per minute).

Furthermore, the uniformity of the ethylene content of the single-layer thin-films of examples 1~5 and comparative examples 1~6 is analyzed. Specifically speaking, the technique of the analysis entails using a Raman spectrometer (manufactured by UniDRON) to measure the ethylene content of each thin-film at five points thereof randomly with a laser source having a wavelength of 473 nm and calculate their standard deviations. The findings of the analysis are displayed by marking the sign "O" to indicate a standard deviation less than 1, the sign "Δ" to indicate a standard deviation equal to 1~2, and the sign "X" to indicate a standard deviation greater than 2.

Preparation of Multilayer Structure

Tie layers (for example, OREVAC® 18729, Arkema), polypropylene, and the EVOH resin particle compositions of examples 1~5 and comparative examples 1~6 undergo coextrusion to form multilayer films of examples 1~5 and comparative examples 1~6, respectively. The multilayer films each have five layers. Specifically speaking, EVOH particles (I), polypropylene (II) and binding resin (III) are each fed to a five-layer coextrusion film-forming machine to prepare multilayer sheets (II)/(III)/(I)/(III)/(II) with the structures described below and with thickness of 300/25/50/25/300 μm, respectively.

Thermoforming Product Preparation and Analysis

Figure 2:
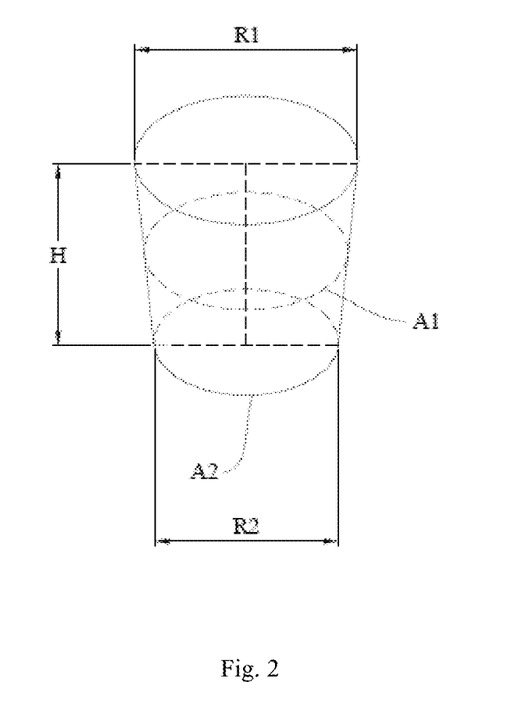
FIG. 2 is a schematic view of the appearance of a thermoforming container according to the disclosure.

Then, thermoforming is performed on the multilayer films of the examples 1~5 and comparative examples 1~6 to form containers (for example, cups and/or cup-shaped containers, for example, fruit glasses) and thereby obtain a thermoforming product (as shown in FIG. 2) in the form of a multilayer container with a height H of 10 cm, upper-end diameter R1 of 10 cm, and bottom-surface diameter R2 of 7 cm. Furthermore, the assessment of the thermoformability of the thermoforming product of examples 1~5 and comparative examples 1~6 entails cutting the thermoforming product of examples 1~5 and comparative examples 1~6 with a razor and measuring the thickness of the EVOH layer at its standing surface region A1 and corner surface region A2 with an optical microscope. The findings of the assessment are displayed by marking the sign "O" to indicate a difference of less than 20% in EVOH layer thickness between the standing surface region A1 and the corner surface region A2, the sign "Δ" to indicate a difference of 20~40% in EVOH layer thickness between the standing surface region A1 and the corner surface region A2, and the sign "X" to indicate a difference of greater than 40% in EVOH layer thickness between the standing surface region A1 and the corner surface region A2.

In another aspect, the appearance of the thermoforming product is examined with the naked eye to detect surface voids. Specifically speaking, the findings of the assessment are displayed by marking the sign "O" to indicate the absence of surface voids of appearance and the sign "X" to indicate the presence of surface voids of appearance.

Furthermore, according to the disclosure, the oxygen transmission rate (OTR, cc/pkg*day) of the thermoforming product of examples 1~5 and comparative examples 1~6 is measured at a relative humidity of 65% and a temperature of 23° C. by OX-TRAN Model 2/22 OTR tester (manufactured by Mocon) with related techniques set forth in ISO 14663~2 to assess its barrier function. The findings of the assessment are displayed by marking the sign "O" to indicate an OTR less than 0.01 cc/pkg*day, the sign "Δ" to indicate an OTR equal to 0.01~0.5 cc/pkg*day, and the sign "X" to indicate an OTR greater than 0.5 cc/pkg*day.

Analysis of Findings in Embodiments and Comparative Examples

The EVOH resin particle compositions of examples 1~5 and comparative examples 1~6 are compared in terms of the uniformity of the ethylene content of the thin-films made therefrom, their subsequent thermoformability, the appearance of thermoforming products, and the OTR of the thermoforming products. The findings are shown in Table 1 and Table 2.

TABLE 1

|  | Example 1 | | Example 2 | | Example 3 | | Example 4 | | Example 5 | |
| --- | --- | --- | --- | --- | --- | --- | --- | --- | --- | --- |
|  | first EVOH particle | second EVOH particle | first EVOH particle | second EVOH particle | first EVOH particle | second EVOH particle | first EVOH particle | second EVOH particle | first EVOH particle | second EVOH particle |
| melting point (° C.) | 165 | 183 | 155 | 192 | 173 | 189 | 155 | 183 | 173 | 198 |
| particle shape | cylindrical | cylindrical | ellipsoidal | spherical | spherical | cylindrical | ellipsoidal | cylindrical | ellipsoidal | ellipsoidal |
| major axis/height (mm) | 5 | 2 | 3 | 3 | 1 | 1 | 5 | 3 | 4 | 4 |
| minor axis/radius (mm) | 1 | 3 | 2 | 3 | 1 | 5 | 1 | 3 | 2 | 1 |
| surface core void volume Vvc ($\mu m^3/\mu m^2$) | 0.002 | 0.010 | 0.320 | 5.400 | 13.200 | 46.700 | 0.041 | 0.220 | 5.400 | 13.200 |
| core material volume Vmc ($\mu m^3/\mu m^2$) | 0.001 | 0.022 | 0.012 | 1.050 | 11.300 | 54.400 | 0.008 | 0.150 | 0.510 | 10.500 |
| root-mean-square height Sq ($\mu m$) | 0.001 | 0.020 | 0.150 | 3.500 | 23.300 | 61.300 | 0.005 | 0.210 | 7.800 | 11.200 |
| surface maximum height Sz ($\mu m$) | 0.030 | 0.120 | 0.140 | 10.200 | 27.900 | 60.300 | 0.510 | 2.220 | 8.600 | 31.400 |
| core height difference Sk ($\mu m$) | 0.010 | 0.030 | 0.210 | 3.420 | 24.600 | 62.300 | 0.110 | 0.530 | 7.800 | 25.600 |
| linear arithmetic mean height Ra ($\mu m$) | 0.001 | 0.012 | 0.011 | 0.120 | 0.560 | 0.750 | 0.009 | 0.080 | 0.330 | 0.430 |
| linear maximum height Rz ($\mu m$) | 0.005 | 0.080 | 0.070 | 1.350 | 6.500 | 7.220 | 0.015 | 0.130 | 3.200 | 3.440 |
| uniformity of the ethylene content of the thin-film | O | | O | | O | | O | | O | |
| thermoformability | O | | O | | Δ | | O | | O | |
| appearance of the thermoforming product | O | | O | | O | | O | | O | |
| OTR of the thermoforming product | 0.080 | | 0.005 | | 0.400 | | 0.012 | | 0.100 | |

TABLE 2

|  | Comparative example 1 | | Comparative example 2 | | Comparative example 3 | | Comparative example 4 | | Comparative example 5 | | Comparative example 6 | |
| --- | --- | --- | --- | --- | --- | --- | --- | --- | --- | --- | --- | --- |
|  | first EVOH particle | second EVOH particle | first EVOH particle | second EVOH particle | first EVOH particle | second EVOH particle | first EVOH particle | second EVOH particle | first EVOH particle | second EVOH particle | first EVOH particle | second EVOH particle |
| melting point (° C.) | 165 | 189 | 178 | 198 | 155 | 183 | 173 | 195 | 165 | 193 | 173 | 183 |
| particle shape | spherical | cylindrical | ellipsoidal | cylindrical | cylindrical | cylindrical | spherical | spherical | ellipsoidal | ellipsoidal | spherical | ellipsoidal |
| major axis/height (mm) | 3.5 | 5.0 | 3.0 | 4.0 | 2.5 | 3.5 | 1.0 | 4.0 | 4.0 | 2.5 | 2.5 | 4.0 |
| minor axis/radius (mm) | 3.5 | 4.5 | 2.0 | 2.0 | 4.0 | 3.0 | 1.0 | 4.0 | 3.5 | 1.0 | 2.5 | 1.0 |
| surface core void volume Vvc ($\mu m^3/\mu m^2$) | 0.001 | 0.005 | 0.001 | 51.600 | 22.100 | 56.400 | 0.440 | 61.200 | 10.001 | 22.100 | 35.400 | 3.500 |
| core material volume Vmc ($\mu m^3/\mu m^2$) | 0.001 | 0.006 | 0.001 | 57.600 | 15.400 | 61.200 | 0.021 | 66.100 | 0.001 | 18.700 | 31.400 | 1.230 |
| root-mean-square height Sq ($\mu m$) | 0.001 | 0.004 | 0.001 | 66.500 | 33.600 | 77.500 | 0.170 | 65.900 | 0.001 | 21.200 | 41.300 | 10.100 |
| surface maximum height Sz ($\mu m$) | 0.002 | 0.050 | 0.001 | 71.300 | 38.600 | 71.400 | 0.210 | 77.600 | 0.001 | 18.300 | 44.600 | 8.700 |
| core height difference Sk ($\mu m$) | 0.005 | 0.008 | 0.003 | 68.900 | 41.300 | 69.300 | 0.320 | 75.200 | 0.003 | 19.300 | 38.900 | 7.600 |

TABLE 2-continued

| | Comparative example 1 | | Comparative example 2 | | Comparative example 3 | | Comparative example 4 | | Comparative example 5 | | Comparative example 6 | |
|---|---|---|---|---|---|---|---|---|---|---|---|---|
| | first EVOH particle | second EVOH particle | first EVOH particle | second EVOH particle | first EVOH particle | second EVOH particle | first EVOH particle | second EVOH particle | first EVOH particle | second EVOH particle | first EVOH particle | second EVOH particle |
| linear arithmetic mean height Ra (μm) | 0.001 | 0.003 | 0.001 | 0.880 | 0.710 | 0.890 | 0.010 | 0.930 | 0.001 | 0.056 | 0.810 | 0.440 |
| linear maximum height Rz (μm) | 0.003 | 0.007 | 0.004 | 9.100 | 8.900 | 9.100 | 0.050 | 8.900 | 0.002 | 6.200 | 9.200 | 5.500 |
| uniformity of the ethylene content of the | Δ | | X | | X | | X | | X | | X | |
| thermo-formabilityt | X | | X | | X | | X | | X | | X | |
| appearance of the thermoforming appearance product | X | | X | | X | | X | | X | | X | |
| OTR of the thermoformi ng product | 1.78 | | 10.24 | | 5.66 | | 7.84 | | 9.11 | | 10.10 | |

The findings shown in Table 1 and Table 2 are explained below. Regarding the EVOH resin particle compositions of examples 1~5, the surface core void volume (Vvc) of the first EVOH resin particles falls within the range of 0.002~14 $\mu m^3/\mu m^2$, and the surface core void volume (Vvc) of the second EVOH resin particles falls within the range of 0.010~48 $m^3/\mu m^2$, allowing the thin-films thus formed to exhibit satisfactory ethylene content uniformity and ideal thermoformability and the thermoforming products thus formed subsequently to exhibit excellent appearance and barrier function. By contrast, regarding the EVOH resin particle compositions of comparative examples 1~6, the surface core void volume (Vvc) of the first and second EVOH resin particles does not fall within the required numerical value range, causing the thin-films thus formed to exhibit poor ethylene content uniformity and poor thermoformability and the thermoforming products thus formed subsequently to exhibit poor appearance and barrier function. Preferably, the second EVOH resin particle has a greater Vvc than the first EVOH resin particle. Preferably, the first EVOH resin particle has a melting point of 135~179° C., and the second EVOH resin particle has a melting point of 180~198° C. Preferably, the first EVOH resin particle has an ethylene content of 36~50 mole %, and the second EVOH resin particle has an ethylene content of 20~35 mole %.

A further comparison of Table 1 and Table 2 reveals additional findings described below. Although the first EVOH resin particle of the EVOH resin particle composition of comparative example 4, the second EVOH resin particle of the EVOH resin particle composition of comparative example 5, and the second EVOH resin particle of the EVOH resin particle composition of comparative example 6 fall within the ranges of Vvc values of the first/second EVOH resin particles defined by the disclosure, respectively, none of the other EVOH resin particles of the EVOH resin particle compositions falls within the ranges of Vvc values. Thus, it is only when both of the two types of EVOH resin particles of an EVOH resin particle composition fall within the Vvc value range defined by the disclosure that the two EVOH resins can exhibit satisfactory miscibility and thereby enable the thin-films thus formed to exhibit satisfactory ethylene content uniformity and thermoformability and the thermoforming products thus formed subsequently to exhibit excellent appearance and barrier function.

The Vvc value anticipated by the disclosure can be adjusted and obtained by adjusting a plurality of factors and a combination thereof in the three phases of drying carried out during EVOH particle processing as follows: A. the first phase of drying must not be carried out with a strongly disturbed dryer; B. the second and third phases of drying must not be both carried out with a strongly disturbed dryer; C. preferably, stationary dryers must not be used to carry out all the three phases of drying.

If the processing process does not involve the aforesaid three situations, it will be desirable to carry out the first phase of drying at 60~80° C. for 2~4 hours, the second phase of drying at 70~110° C. for 15~30 hours, and the third phase of drying at 100~120° C. for 15~30 hours.

All the ranges set forth herein are intended to include every specific range that lies within a given range and include a combination of sub-ranges lying within the given range. Unless otherwise specified, every range set forth herein includes the endpoints of the range. Therefore, for example, "a range 1-5" means 1, 2, 3, 4 and 5 and includes sub-ranges, such as 2-5, 3-5, 2-3, 2-4, and 1-4.

All the publications and patent applications cited herein are hereby incorporated by reference. Furthermore, for any and all purposes, each of the publications and patent applications is definitely and individually specified to be hereby incorporated by reference. The disclosure shall prevail in case of inconsistency between the disclosure and any one of the publications and patent applications hereby incorporated by reference.

The verbs "comprise", "have" and "include" used herein are open-ended and nonrestrictive as far as their meanings are concerned. Each of the indefinite articles "an" and "a" and the definite article "the" used herein is descriptive of both a plural noun and a singular noun. The expression "one or more" used herein means "at least one" and thus refers to one single feature or a mixture/combination of features. The symbol "~" placed between two numerical values denotes an inclusive range where the two numerical values are included in the range.

Except for implementing embodiments or unless otherwise specified, all units used to describe ingredients, contents and/or reaction criteria in terms of quantity may, in all situations, be further accompanied by the preposition "around" to give allowance of a deviation of 5% from the actual numerical value specified. The expression "basically not including" or "substantially not including" used herein refers to a specific feature with a less than approximately 2% likelihood of occurrence. All essential elements or features may be negatively excluded from the appended claims even if they are definitely set forth therein.

What is claimed is:

1. An ethylene-vinyl alcohol copolymer (EVOH) resin particle composition, comprising:
   a first EVOH resin particle having a surface core void volume (Vvc) of 0.002~14 um$^3$/um$^2$, and the first EVOH resin particle has an ethylene content of 36~50 mole %, and
   a second EVOH resin particle having a surface core void volume (Vvc) of 0.010~48 um$^3$/um$^2$, and the second EVOH resin particle has an ethylene content of 20~35 mole %;
   wherein the second EVOH resin particle has a greater Vvc than the first EVOH resin particle.

2. The EVOH resin particle composition of claim 1, wherein the first EVOH resin particle has a melting point of 135~179° C., and the second EVOH resin particle has a melting point of 180~198° C.

3. The EVOH resin particle composition of claim 1, wherein the EVOH resin particle is cylindrical, elliptic cylindrical, prismoidal, spherical, ellipsoidal or biconvex-disk-shaped and has a major axis/height of 1~5 mm and a minor axis of 1~5 mm.

4. The EVOH resin particle composition of claim 1, which has a ratio of the first EVOH resin particle to the second EVOH resin particle by weight percentage ranges from 5:95 to 75:25.

5. The EVOH resin particle composition of claim 1, which has a boron content of 5~550 ppm.

6. The EVOH resin particle composition of claim 1, which has an alkali metal content of 10~550 ppm.

7. The EVOH resin particle composition of claim 1, wherein the first EVOH resin particle has a surface core material volume (Vmc) of 0.001~12 μm$^3$/μm$^2$, and the second EVOH resin particle has a surface core material volume (Vmc) of 0.022~55 μm$^3$/μm$^2$.

8. The EVOH resin particle composition of claim 1, wherein the first EVOH resin particle has a root-mean-square height (Sq) surface parameter of 0.001~25 μm, and the second EVOH resin particle has a root-mean-square height (Sq) surface parameter of 0.020~65 μm.

9. The EVOH resin particle composition of claim 1, wherein the first EVOH resin particle has a surface maximum height (Sz) surface parameter of 0.030~28 μm, and the second EVOH resin particle has a surface maximum height (Sz) surface parameter of 0.120~65 μm.

10. The EVOH resin particle composition of claim 1, wherein the first EVOH resin particle has a core height difference (Sk) surface parameter of 0.010~25 μm, and the second EVOH resin particle has a core height difference (Sk) surface parameter of 0.030~65 μm.

11. The EVOH resin particle composition of claim 1, wherein the first EVOH resin particle has a linear arithmetic mean height (Ra) surface parameter of 0.001~0.990 μm, and the second EVOH resin particle has a linear arithmetic mean height (Ra) surface parameter of 0.001~0.990 μm.

12. The EVOH resin particle composition of claim 1, wherein the first EVOH resin particle has a linear maximum height (Rz) surface parameter of 0.0010~9.9000 μm, and the second EVOH resin particle has a linear maximum height (Rz) surface parameter of 0.0010~9.9000 μm.

13. An ethylene-vinyl alcohol copolymer film formed from the EVOH resin particle composition of claim 1.

14. A multilayer structure, comprising:
   (a) at least one layer of the ethylene-vinyl alcohol copolymer film formed from the EVOH resin particle composition of claim 1;
   (b) at least one layer of a polymer layer; and
   (c) at least one layer of a binding layer.

15. The multilayer structure of claim 14, wherein the polymer layer is one selected from the group consisting of a low-density polyethylene layer, polyethylene grafted maleic anhydride layer, polypropylene layer and nylon layer, and the binding layer is a tie layer.

16. The multilayer structure of claim 14, wherein the multilayer structure is a polymer layer/binding layer/ethylene-vinyl alcohol copolymer film/binding layer/polymer layer.

* * * * *